US012644541B1

(12) United States Patent
Zarazua

(10) Patent No.: US 12,644,541 B1
(45) Date of Patent: Jun. 2, 2026

(54) PIPE CONDUIT LOCATOR SYSTEM

(71) Applicant: Terser Tools Ltd, Fairfield, CA (US)

(72) Inventor: Abel Zarazua, El Sobrante, CA (US)

(73) Assignee: Terser Tools Ltd, Fairfield, CA (US)

( * ) Notice: Subject to any disclaimer, the term of this patent is extended or adjusted under 35 U.S.C. 154(b) by 0 days.

(21) Appl. No.: 19/177,493

(22) Filed: Apr. 11, 2025

Related U.S. Application Data

(60) Provisional application No. 63/786,948, filed on Apr. 10, 2025.

(51) Int. Cl.
*G01B 11/27* (2006.01)
*F16L 1/10* (2006.01)

(52) U.S. Cl.
CPC ................ *F16L 1/10* (2013.01); *G01B 11/27* (2013.01)

(58) Field of Classification Search
CPC .................................. F16L 1/10; G01B 11/27
See application file for complete search history.

(56) References Cited

U.S. PATENT DOCUMENTS

| | | | | | |
|---|---|---|---|---|---|
| 5,568,265 | A | * | 10/1996 | Matthews | G01B 11/27 356/138 |
| 6,124,935 | A | * | 9/2000 | Matthews | G01C 15/008 356/138 |
| 6,375,128 | B1 | * | 4/2002 | Condon | F16L 3/243 248/57 |
| 6,393,708 | B1 | * | 5/2002 | Culver | G01B 11/27 33/286 |
| 6,427,347 | B1 | * | 8/2002 | Butler, Sr. | G01C 15/002 33/290 |
| 6,857,193 | B2 | * | 2/2005 | Kallesen | G01C 15/008 33/286 |
| 6,986,209 | B2 | * | 1/2006 | Cook | G01C 15/008 33/286 |
| 7,748,127 | B1 | * | 7/2010 | Cosimano | G01C 15/002 33/286 |
| 7,793,423 | B2 | * | 9/2010 | Loftis | F16L 1/10 356/138 |
| 8,893,395 | B2 | * | 11/2014 | Mickow | G01C 15/002 33/529 |
| 8,893,396 | B2 | * | 11/2014 | Gamon | G01C 15/004 33/529 |
| 11,525,526 | B1 | * | 12/2022 | Hentkowski | H02G 3/263 |
| 11,892,102 | B2 | * | 2/2024 | Shiau | E02F 5/145 |
| 2002/0038513 | A1 | * | 4/2002 | Kallesen | G01C 15/008 33/286 |
| 2004/0111902 | A1 | * | 6/2004 | Fletcher | G01C 15/10 33/286 |
| 2005/0060901 | A1 | * | 3/2005 | Cook | G01C 15/008 33/286 |

(Continued)

*Primary Examiner* — Yaritza Guadalupe-McCall
(74) *Attorney, Agent, or Firm* — Straylight LLP

(57) ABSTRACT

Techniques are disclosed for precisely locating and marking placement locations for drilling or conduit installation in construction environments. A pipe conduit locator system includes a focused-light system disposed within the housing and a clamping mechanism having a plurality of prongs configured to engage with a hollow surface. The focused-light system projects light towards a target location and the clamping mechanism moves between an open position and a closed position. A clamping mechanism secures the system to an elongated body, ensuring stable alignment during operation.

16 Claims, 7 Drawing Sheets

(56)                        References Cited

U.S. PATENT DOCUMENTS

| 2012/0117813 | A1* | 5/2012 | Stevenson | G01C 15/002 |
| | | | | 33/286 |
| 2014/0115907 | A1* | 5/2014 | Gamon | G01C 15/004 |
| | | | | 33/286 |
| 2015/0285607 | A1* | 10/2015 | Helmore | G01B 5/12 |
| | | | | 33/558.2 |
| 2024/0310166 | A1* | 9/2024 | Goffredo | G01B 11/27 |

* cited by examiner

100

400

Figure 5:
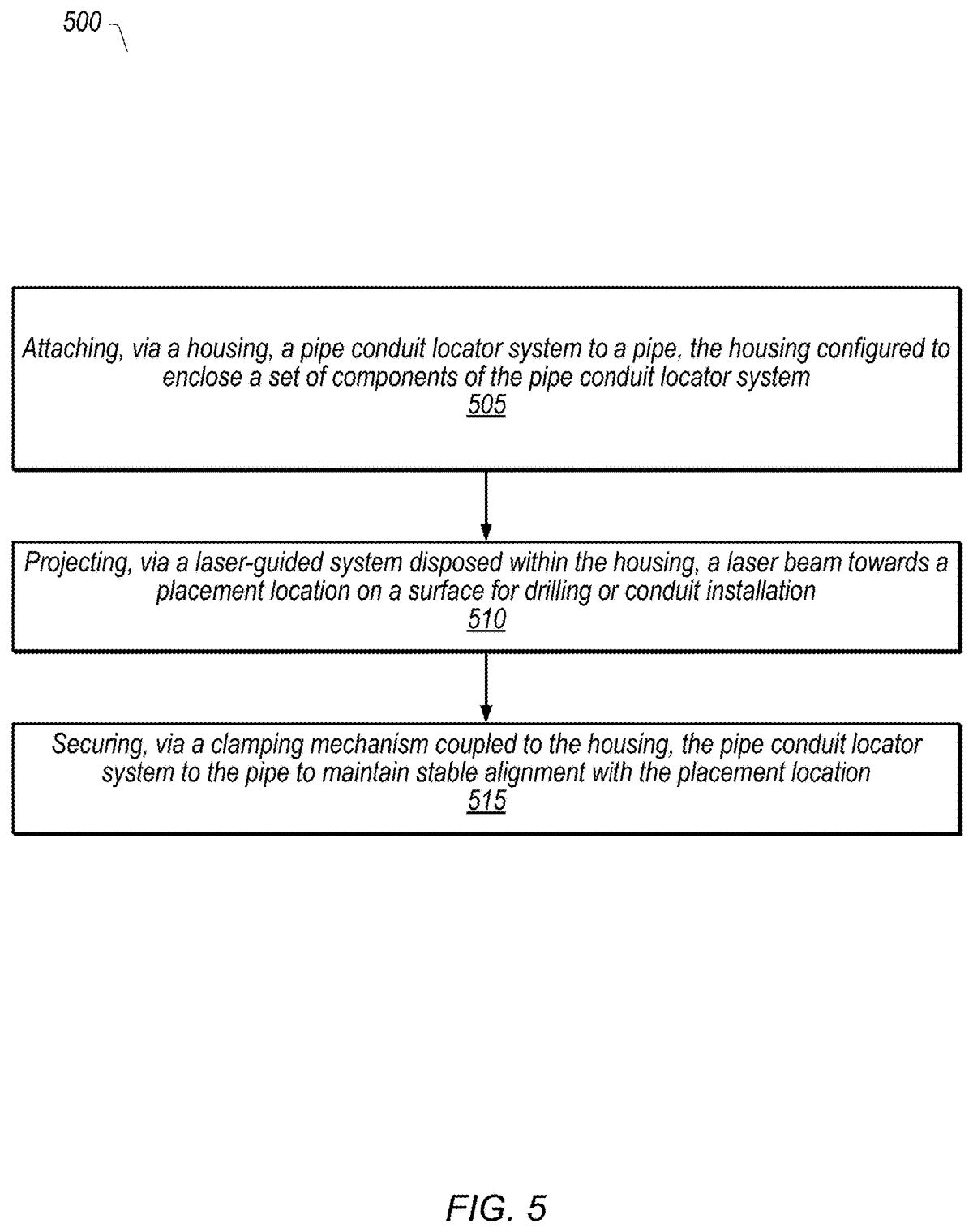

500

Attaching, via a housing, a pipe conduit locator system to a pipe, the housing configured to enclose a set of components of the pipe conduit locator system
505

Projecting, via a laser-guided system disposed within the housing, a laser beam towards a placement location on a surface for drilling or conduit installation
510

Securing, via a clamping mechanism coupled to the housing, the pipe conduit locator system to the pipe to maintain stable alignment with the placement location
515

PIPE CONDUIT LOCATOR SYSTEM

TECHNICAL FIELD

This disclosure generally relates to construction instruments and systems, and more specifically, to instruments and methods for accurately locating and aligning entry points for pipes, conduits, cable pathways, and other elongated structures during installation or construction.

BACKGROUND

In the construction and electrical industries, accurately locating the center of a pipe, conduit, or raceway is a critical task when creating holes for installation through various obstacles, such as walls, ceilings, floors, or electrical panels. Traditional methods often rely on manual measurements, mockup templates, or trial-and-error processes. For example, existing techniques may involve measuring the diameter and alignment of a pipe or conduit and marking a corresponding point on a target surface, which can be prone to error and inefficiency.

Several tools and instruments have been developed to address this challenge, but they often have limitations. Torpedo levels with integrated laser pointers (e.g., such as the Klein Tools LBL100), for instance, provide basic alignment assistance but are restricted to specific pipe sizes and lack versatility for other applications. Similarly, tools like the EMT Conduit Layout Tool or discontinued GD Center Finder are designed for particular use cases, such as spacing knockouts or measuring specific dimensions, but such tools/instruments do not provide a universal solution for accurately pinpointing the center of a pipe or conduit across a range of scenarios. These tools/instruments are often limited to static measurements and do not accommodate dynamic adjustments or provide real-time feedback.

Furthermore, traditional methods may result in material waste, time inefficiencies, and potential inaccuracies, especially in complex or confined spaces. For example, creating mockup pipes or manually marking entry points often involves trial and error, leading to unnecessary labor and material costs. A mockup pipe is an artificial extension or temporary conduit segment made of materials such as PVC, EMT (Electrical Metallic Tubing), or scrap metal, used to simulate the final installation path of a pipe or conduit. For instance, it may be cut to match the expected length and positioned at the intended entry and exit points to manually determine the correct drilling location before committing to a permanent installation. While this method may help align pipes through obstacles like walls, floors, or ceilings, it may require additional materials, measurements, and adjustments, leading to inefficiencies in time and labor. While existing tools/instruments offer partial solutions, there remains a need for a universal, adaptable system that can quickly and accurately locate the center of a pipe or conduit for drilling or installation purposes, and accompanying measurements, particularly in challenging or varied construction environments.

BRIEF DESCRIPTION OF THE DRAWINGS

FIG. 5 is a flow diagram illustrating an example method that implement techniques described herein.

DETAILED DESCRIPTION

In various embodiments, the present disclosure introduces a focused-light locator system designed to improve the accuracy of drilling and piping operations in construction environments. In some embodiments, the system uses a focused light-guided instrument that attaches to a conduit, pipe, or other hollow tube or surface and projects focused light such as a laser beam to pinpoint the location for drilling. The system may be adaptable to various pipe sizes, including, but not limited to, Electrical Metallic Tubing (EMT), and may also assist in broader applications, such as ensuring straight cable runs through obstacles like walls, floors, or ceilings. In some examples, a temporary conduit or mock-up pipe may be employed to guide drilling through multiple joists for concealed cable installations, allowing the instrument to ensure precision and alignment without the need for manual measurements. This approach reduces the time and effort required for installation while maintaining high accuracy. Additionally, the system may incorporate advanced features, such as distance measurement and leveling capabilities, to further enhance precision and efficiency.

Some aspects of disclosed embodiments provide several key benefits over traditional methods. By employing a light-guided system, users can achieve more precise hole placement without relying on trial-and-error techniques or manual mock-ups, which can lead to more efficient installation workflows. Further, this may result in faster job completion, reduced labor costs, reduced guess-work, and minimized material waste. Moreover, the system's ability to attach directly to the conduit or pipe simplifies the alignment process, which may enable users to accurately drill through obstacles while ensuring proper alignment with entry points in electrical panels or junction boxes. The incorporation of distance measurement and leveling capabilities further enhances the instrument's versatility, allowing it to be used in a variety of installation scenarios with reduced adjustment. Some aspects may also streamline construction, improve accuracy, safety, and offer substantial cost savings in both time and materials.

Figure 1:
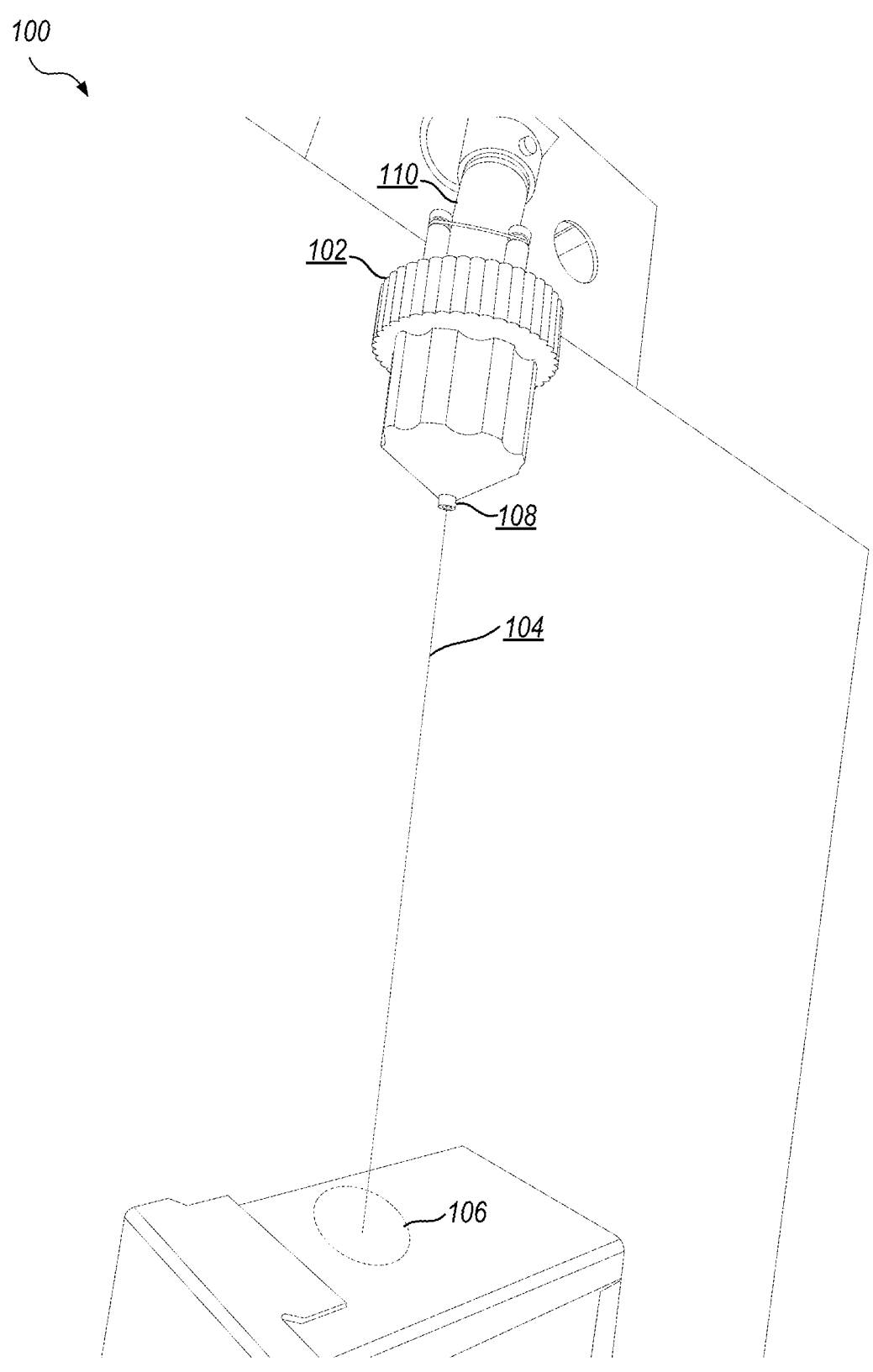
FIG. 1 is a block diagram illustrating an example of an environment implementing a pipe conduit locator system, according to some embodiments.

FIG. 1 is a block diagram of one embodiment of an environment 100 implementing a pipe conduit locator system 102. In illustrated embodiment, environment 100 includes pipe conduit locator system 102, pipe 110, focused-light system 108, light beam 104, and placement location 106. Focused-light system 108 may be configured to project a visible or infrared beam, such as light beam 104, to indicate the placement location. In some embodiments, focused-light system 108 may include high-intensity LEDs, structured light projectors, collimated beam sources, a L.A.S.E.R. (light amplification by stimulated emission of radiation, or simply "laser"), or the like that generates a concentrated beam of light for alignment purposes.

The pipe conduit locator system 102 may include a housing 112 configured to enclose and protect its internal components (e.g., focused-light system 108). In some examples, housing 112 may represent the physical structure or external casing of the pipe conduit locator system 102, providing a durable and stable framework that supports the internal mechanisms. In various embodiments, the housing may be made from materials such as plastic, metal, or composite materials, selected for their durability, lightweight properties, or resistance to environmental factors (e.g., moisture, dust, or impact), and/or the like. Pipe conduit locator system 102 may also provide a user-friendly interface or handle (not shown) for ease of operation.

In some aspects, pipe conduit locator system 102 attaches to the end of pipe 110 and uses focused-light system 108 to project light beam 104, which assists in determining placement location 106 for drilling or conduit installation. In some examples, pipe 110 is not a hollow surface but is a block or other shape that clamping mechanism can attach to. In some embodiments, locator system 102 provides a fast and accurate solution for aligning conduits, pipes, or raceways and/or the like, which may be supported in various installation scenarios discussed herein.

In some examples, pipe conduit locator system 102 may be designed to attach securely to different types and sizes of pipes or conduits. In some configurations, pipe conduit locator system 102 could be threaded onto pipe 110 or attached using a clamp, magnet, or other fastening mechanism, ensuring a stable connection during alignment. The term pipe as described herein, may refer broadly to various types of conduits, tubes, or raceways, including but not limited to Electrical Metallic Tubing (EMT), Polyvinyl Chloride (PVC) pipes, Non-metallic (NM) cable raceways, Armored Cable (AC), Metal Clad (MC) cable conduits, flexible conduits, and rigid pipes of varying materials such as metal or plastic. Once attached, focused-light system 108 may project light beam 104 towards a target area, allowing the user to visualize the exact spot where a hole should be created or where the conduit should be installed. Placement location 106, as indicated by the laser, provides a clear and highly visible mark that can guide subsequent drilling or installation actions. This approach may improve precision and reduce the time spent on manual measurements or adjustments. This location can be digitized by using a visual sensor that is aimed at placement location 106. In some examples, the information from the visual sensor is saved to a database that contains other site plan information.

In various embodiments, focused-light system 108, as depicted, provides a powerful instrument for ensuring that conduits or pipes are aligned with existing equipment, structures, and/or electrical panels with increased precision. By way of example, if a conduit needs to pass through a wall and align with a junction box on the opposite side, focused-light system 108 enables the user to mark the exact entry and/or exit points on both sides of the wall. This method may minimize errors and allow for a clean, accurate alignment. By eliminating guesswork, pipe conduit locator system 102 helps avoid the need for rework or material waste, leading to cost savings in both time and resources. This overcomes longstanding inefficiencies in the industrial building context, by utilizing a unique combination of previously unrelated technologies (e.g., clamps and lasers). Data synchronization may be further improved in order to create additional efficiency in digital mapping of a job site, such as integrating alignment data with building information modeling (BIM)

software, construction management platforms, or augmented reality (AR) visualization tools to enhance planning and real-time decision-making.

As depicted, FIG. 1 illustrates a light beam approach to pipe conduit locator system 102, but the present disclosure is not limited to laser technology. In some embodiments, pipe conduit locator system 102 may employ various alignment mechanisms suited to different operational needs or user preferences. For example, an LED pointer could be used instead of a light beam for visible alignment, or an ultrasonic sensor could pinpoint distances and obstacles, providing an audible signal to mark placement locations. Other configurations may include retractable arms or mechanical pointers that physically extend to mark the target location 106. Each of these options may be advantageous depending on the lighting conditions, material surfaces, or specific alignment requirements of the installation environment.

The versatility of pipe conduit locator system 102 may allow it to be used with a wide range of pipes, conduits, and raceways, including, but not limited to, electrical metallic tubing (EMT), polyvinyl chloride (PVC) pipes, and various rigid or flexible conduit types. In addition to electrical installations, pipe conduit locator system 102 may be applicable in other contexts, such as plumbing, HVAC (heating, ventilation, and air conditioning) systems, and industrial piping, where precise hole placement and conduit alignment are required. Pipe conduit locator system system's 102 adaptability enables it to function in diverse construction settings, from residential installations to commercial and industrial projects, where the alignment and placement of conduits and pipes need to meet stringent accuracy standards. Furthermore, by utilizing different attachment options, such as threaded connectors or flexible straps, system 102 can be quickly and securely mounted on conduits of various diameters, enhancing its usability across different applications.

Figure 7:
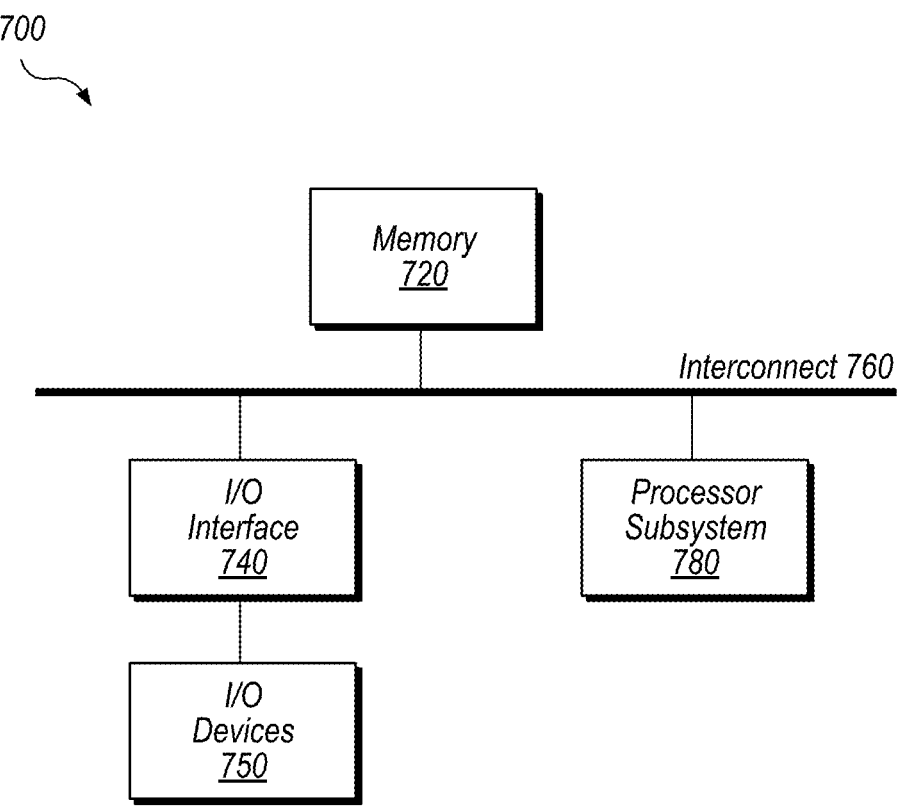
FIG. 7 is a block diagram illustrating elements of an exemplary computer system for implementing techniques described herein.

In some embodiments, pipe conduit locator system 102 may integrate advanced electronics and computing capabilities to further enhance its accuracy and functionality. In some examples, a small onboard computer system (e.g., computer system 700 as illustrated in FIG. 7) within system 102 may leverage artificial intelligence (AI) and machine learning (ML) algorithms to automatically calculate more placement angles and distances, based on historical data or learned patterns from previous installations, repairs, failures, and construction notes and feedback, environmental factors, and/or the like and/or combinations thereof.

In some embodiments, system 102 may detect deviations in alignment and/or automatically adjust focused-light system 108 to account for obstacles or irregular surfaces. In some embodiments, the AI-enhanced system, as discussed further below, may analyze construction data from a centralized server (not shown) and in response to the data, the AI-enhanced system may suggest optimizations based on the construction site's goals, past installations, engineering specifications, or other data. In some examples, system 102 may provide data regarding distance and/or data from a secondary source (e.g., construction site, etc.) and in response the AI-enhanced system may determine an angle for conduit placement that minimizes the required piping length or reduces material waste, recommend using a gradual curve instead of multiple jointed connections to decrease stress on a pipe, improving structural integrity and longevity, and the like. In some examples, The AI-enhanced system may, based on information received from system 102, may suggest alternative drilling points to avoid existing structural elements, such as beams or electrical wiring, Some advantages of disclosed embodiments include a streamlined installation process, improvements in safety, reduced waste, and other improvements discussed herein. System 102 may also include sensors that measure distance or detect level alignment, providing the user with feedback to ensure precise positioning. Furthermore, focused-light system 102 could be integrated into a digital environment, such as a CAD file or construction management platform (e.g., Procore), allowing users to access blueprints, layouts, or other digital plans on mobile devices like phones or tablets for seamless alignment with project requirements. In some embodiments, data from one or more of FIGS. 1-6 may be uploaded to the digital environment, enabling AI-driven recommendations for improved conduit routing based on real-time job site conditions.

In some embodiments, pipe conduit locator system 102 may also integrate wireless connectivity to transmit alignment data or settings to a connected mobile device or computer. This feature may allow for remote monitoring and/or adjustment of focused-light system 108, enabling supervisors and/or project managers to verify alignment accuracy without being physically present at the installation site. The wireless communication could also provide advanced threat analytics (ATA) logs for quality control, documenting each alignment for record-keeping and compliance purposes in regulated environments.

In some embodiments, pipe conduit locator system 102 may incorporate sensors, such as Inertial Measurement Unit (IMU), an Inertial Navigation System (INS), and/or the like that includes accelerometers, gyroscopes, and/or sensors such as Global Navigation Satellite System (GNSS) receivers or transceivers that are used to determine a location based on receipt of one or more signals from one or more satellites associated with one or more GNSS system. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. The inclusion of these sensors could enhance the precision of alignment by providing real-time orientation, position, and movement data. In some examples, accelerometers and gyroscopes may allow system 102 to detect subtle tilts or shifts in the orientation of pipe 110, enabling immediate corrective feedback to ensure accurate alignment throughout the installation process. Additionally, GNSS functionality could be leveraged for geolocation tagging, allowing precise documentation of the installation position within larger construction projects or geographically dispersed sites. These sensor integrations may further augment the capabilities of system 102, making it adaptable to complex installations that demand exact spatial accuracy. In some examples, pipe conduit locator system 102 supports level detection, which assists in real-time alignment and documentation of conduit installations. An integrated level sensor may ensure that the pipe is installed at the intended angle, reducing the risk of misalignment that could impact structural integrity or drainage flow. System 102 may provide visual, audio, or haptic feedback using vibrational sensors to alert installers if adjustments are needed before drilling or securing the conduit in place. In some examples, visual feedback could be a light pattern such as a flashing light or turning a different color, such as the color red. In some examples, audio feedback includes a speaker that projects a warning, e.g., "improper alignment." Additionally, geotagging functionality may allow each installed conduit to be recorded with precise geographic coordinates, including 3D coordinate registration, simultaneous localization and mapping, LiDAR mapping, optical tracking, and motion tracking and/or combinations thereof. This data may be transmitted to a central construction platform for immediate verification, ensuring that installation plans are followed accurately. In some embodiments, pipe conduit locator system 102 may communicate with networked construction tools, such as robotic drillers or automated pipe benders, to enhance workflow precision and efficiency. These real-time capabilities reduce errors and allow installers to make on-the-fly corrections before finalizing the conduit placement. For instance, if the installer determines that the alignment is off of the target, based on the projection of the light beam, the installer may make adjustments to the pipe accordingly so that the alignment can be on target.

In some embodiments, data from the pipe conduit locator system 102 is synchronized with a site plan system, such as a Building Information Modeling (BIM) platform, a digital twin environment, or a cloud-based construction management system (e.g., Procore, Autodesk BIM 360, Trimble Connect), VR/AR, etc. This synchronization may enable seamless integration of real-time conduit placement data into digital blueprints, allowing construction teams to coordinate installation workflows and reduce trade conflicts. In some examples, during a large-scale commercial build, geotagging may be used to create a digital map of all installed conduits, ensuring that electrical, plumbing, and HVAC installations do not interfere. If a conduit needs to be relocated due to unforeseen obstacles, the system may suggest an alternative path while automatically updating the digital plans. Additionally, integration of pipe conduit locator system 102 with Augmented Reality (AR) and Virtual Reality (VR) visualization tools could allow installers to see projected conduit pathways including orientation of system 102 in real-time, using tablet-based AR overlays or wearable devices. This data synchronization also enhances long-term facility management. Years after installation, facility managers can use the stored site plan data to precisely locate conduits hidden behind walls, ceilings, or underground, reducing unnecessary excavation or wall penetration during maintenance. In some embodiments, the system may provide automated compliance reports, helping contractors and inspectors verify that conduit installations align with safety codes and project specifications. By enabling continuous digital updates, pipe conduit locator system 102 may help construction teams reduce costly rework, ensure efficient coordination between trades, and streamline installation workflows for smart buildings and large-scale infrastructure projects, and other advantages discussed herein.

In some advantages of disclosed embodiments, pipe conduit locator system 102 offers a robust solution for precisely locating and marking drilling or installation points for conduits, pipes, and/or raceways. Through the use of laser-guided alignment or alternative guiding methods, system 102 reduces the need for manual measurements and enhances alignment accuracy. Additionally, by incorporating advanced technologies such as AI and ML, system 102 may be capable of intelligently adapting to various construction scenarios.

Figure 2:
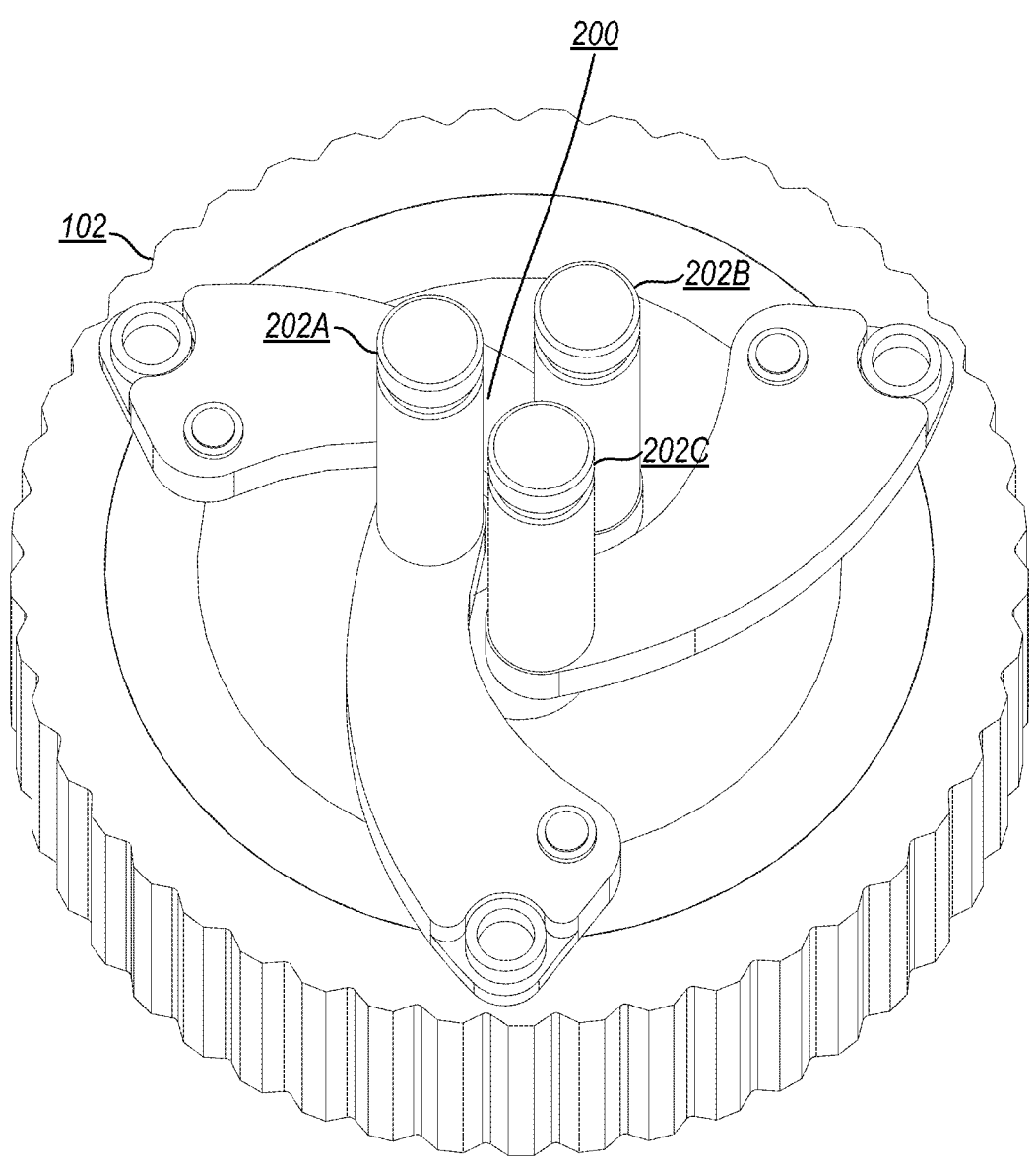
FIG. 2 is a block diagram illustrating an example of a pipe conduit locator system clamping mechanism in a closed position, according to some embodiments.

FIG. 2 is a block diagram of one embodiment of a pipe conduit locator system clamping mechanism in a closed position. In the illustrated embodiment, pipe conduit locator system 102 includes a clamping mechanism 200 designed to securely attach to the outer surface of a pipe, conduit, or raceway (e.g., pipe 110 as illustrated above with respect to FIG. 1). In some examples, FIG. 2 is an illustration of the flipside of pipe conduit system 102 illustrated above with respect to FIG. 1. In the illustrated embodiment, clamping mechanism 200 utilizes three prongs 202A, 202B, and 202C that engage the surface of the pipe to ensure a stable and secure fit. In some embodiments, the number of prongs 202 may vary to suit different pipe diameters, materials, or specific application requirements. In some examples, a system with four or more prongs supports additional stability, and a two-prong design might be more suitable for smaller or more confined spaces.

In some embodiments, clamping mechanism 200 operates in a closed position to firmly grip the pipe during use, preventing movement or misalignment meanwhile pipe conduit locator system 102 performs its alignment and marking tasks. In some examples, prongs 202 of clamping mechanism (also clamp, attachment mechanism) 200 may feature additional enhancements, such as rubberized or textured surfaces, to improve grip and reduce slippage when attached to smooth or slippery materials, such as polished metal or PVC. In some examples, clamping mechanism 200 includes tension springs, screws, and/or other tightening mechanisms that may allow the user to adjust the grip strength to accommodate pipes of varying thicknesses and materials.

In some embodiments, clamping mechanism 200 may include magnetic clamps. In some examples, magnetic clamps may be employed for ferrous materials, suction-based attachments may be used for smooth non-metallic surfaces, or threaded connectors for pipes with pre-existing threading, and/or the like and/or combinations thereof. In some embodiments, clamping mechanism 200 may also integrate quick-release features, such as a lever or push-button, to simplify the process of attaching or detaching the system.

Some advantages of the modular design of clamping mechanism 200 allows for customization and adaptability. In some examples, interchangeable prong sets could be provided to accommodate specific pipe sizes or shapes, such as rectangular or oval raceways. This flexibility enhances the overall versatility and usability of pipe conduit locator system 102 across a wide range of applications.

In some embodiments, clamping mechanism 200 may also incorporate sensors to enhance its functionality. In some examples, pressure sensors could provide feedback on whether clamp 200 is adequately secured, e.g., whether one or more prongs are not securely clamped, while position sensors might verify that the system is aligned correctly with the pipe's axis (feedback may correspond with feedback discussed above with respect to FIG. 1). These sensors could transmit data to an onboard computer system (e.g., computer system 700 as illustrated below with respect to FIG. 6) or a connected mobile device, providing real-time feedback and ensuring precise alignment during use.

In some embodiments, prongs 202 may be controlled by a motor (not illustrated in FIG. 2) at the joint which may be remotely controlled to activate fastening or unfastening.

Figure 3:
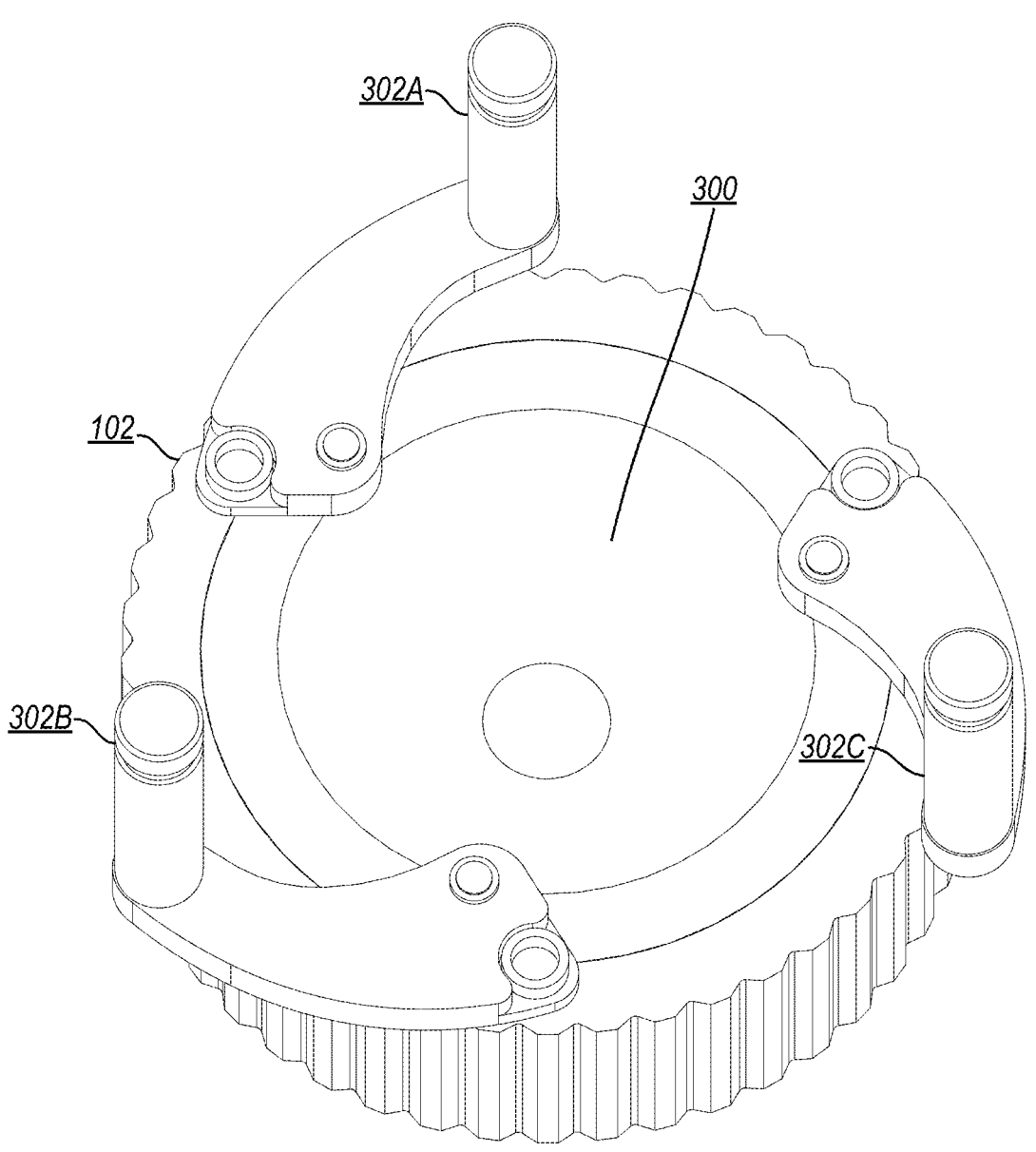
FIG. 3 is a block diagram illustrating an example of a pipe conduit locator system clamping mechanism in an open position, according to some embodiments.

FIG. 3 is a block diagram of one embodiment of a pipe conduit locator system clamping mechanism 300 in an open position. In the illustrated embodiment, pipe conduit locator system 102 includes clamping mechanism 300 (which may correspond to clamping system 200), which is depicted in an open configuration. In the open position, clamping system 200 may be positioned onto or removed from the outer surface of a pipe, conduit, or raceway, etc. This open position allows the prongs of clamping mechanism 300 to be spaced apart, enabling users to easily fit the mechanism onto pipes of varying diameters or shapes.

Similar to the closed configuration depicted in FIG. 2, clamping mechanism 300 is designed for versatility and adaptability. In the open position, the three-prong design of clamping mechanism 300 can accommodate a range of pipe sizes and materials, including cylindrical and non-cylindrical shapes. The open configuration facilitates quick and efficient installation, particularly in tight or constrained spaces where maneuvering the system into position might otherwise be challenging.

The prongs 302 (e.g., 302A, 302B, 302C) of clamping mechanism 300, when open, may include enhanced features such as rubberized, textured, or padded surfaces to prevent damage to the pipe during attachment and ensure a secure fit once closed. In some embodiments, the prongs are equipped with springs or other tension mechanisms that assist in returning the clamp to the closed position once the system is correctly aligned with the pipe.

While the embodiment shown illustrates a three-prong 302 design, clamping mechanism 300 could alternatively be implemented with a different number of prongs or entirely different attachment methods. In some examples, the open position could feature hinged arms, telescoping prongs, or even expandable bands that conform to the pipe's surface when tightened. In some examples, the hinged arms are configured to rotate axially in order to move the prongs from an open to a closed position. In some examples, clamping mechanism 300 includes visual indicators or markings to help users align the prongs properly before securing the clamp.

The open position also highlights the modular nature of clamping mechanism 300. In some embodiments, the prongs or other attachment elements can be swapped out to fit pipes of specific sizes, materials, or shapes. In some examples, modular prong tips could be used for specialized applications, such as oval raceways or conduits with irregular surfaces.

In some embodiments, clamping mechanism 300 may incorporate alignment aids or sensors to ensure proper placement before closing. In some examples, integrated position sensors could verify that the mechanism is centered on the pipe, while pressure sensors might indicate whether the prongs are sufficiently secure once closed. Additionally, other spatial detection technologies could be integrated to further enhance accuracy, such as technologies mentioned above with respect to FIGS. 1-2.

In some embodiments, one or more ultrasonic sensors may detect nearby surfaces or objects to ensure the pipe is positioned correctly within a confined space, while one or more infrared sensor could verify proximity to surrounding structures. In some configurations, LiDAR-based mapping or camera-based vision systems may be employed to detect obstructions or measure distances relative to the intended installation area. These spatial awareness features could transmit real-time feedback to a connected computing system (e.g., computer system 700 as illustrated below with respect to FIG. 6), which may enhance ease of use, precision, and automation during installation. In some embodiments, these spatial sensors may also assist in detecting existing conduit paths to optimize new placements and avoid conflicts with pre-installed infrastructure 700. In some examples, one or more of these technologies discussed with respect to FIG. 3 could be used in combination with other technologies discussed herein.

Open position as depicted in FIG. 3 emphasizes the ease of use and adaptability of pipe conduit locator system 102, making it suitable for a variety of installation environments. By allowing for quick attachment and detachment, clamping mechanism 300 reduces the time and effort required to position the system, further streamlining the overall alignment and drilling process.

Figure 4:
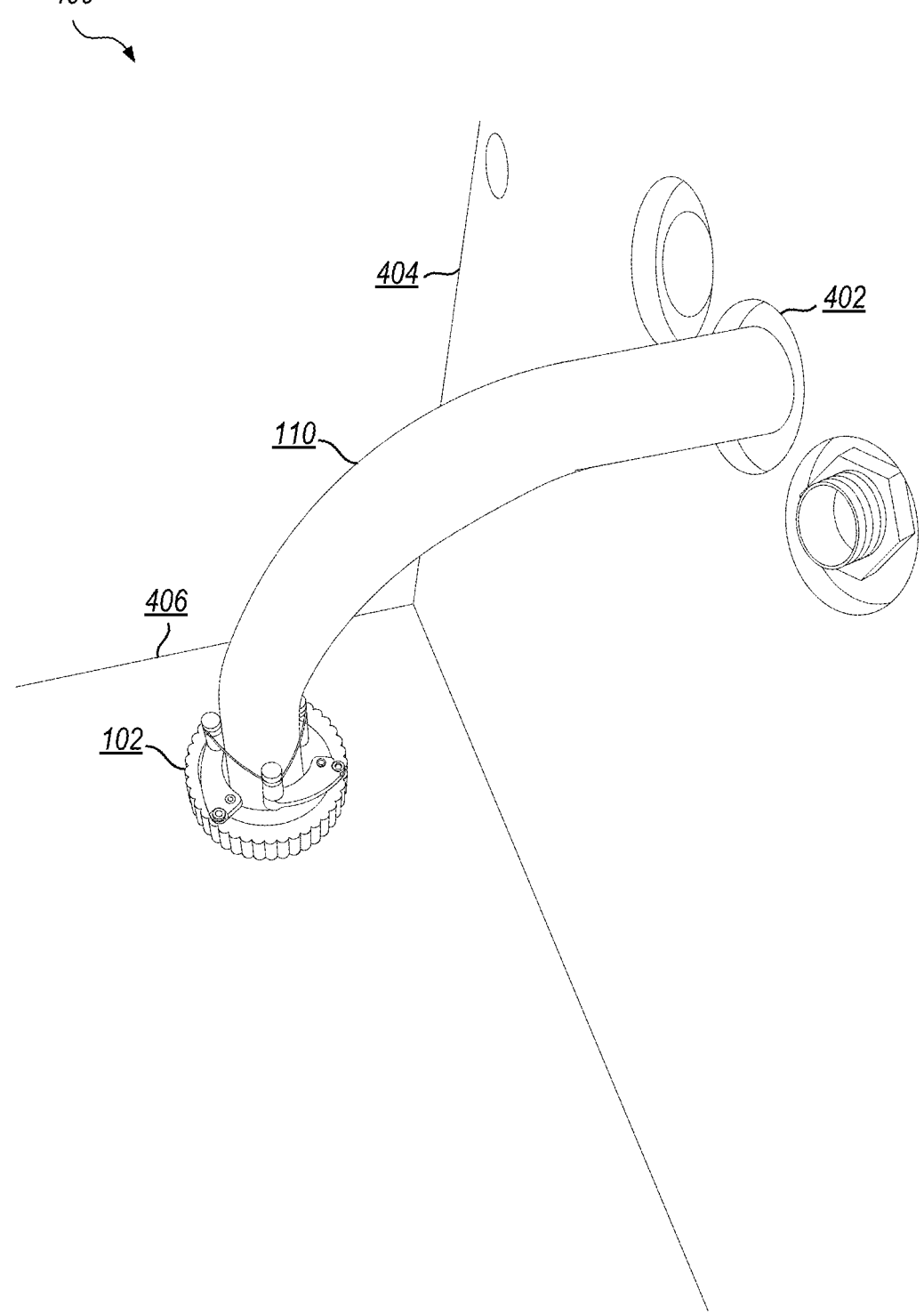
FIG. 4 is a block diagram illustrating an example of another environment implementing a pipe conduit locator system, according to some embodiments.

FIG. 4 is a block diagram of one embodiment of an environment 400 implementing a pipe conduit locator system 102. In illustrated embodiment, environment 400 includes pipe conduit locator system 102, pipe 110, first surface 404, and second surface 406. Pipe 110 is shown extending through hole 402 in first surface 404, which serves as an exit point for the pipe. Pipe conduit locator system 102 is attached to the lower end of pipe 110, projecting towards second surface 406 to identify a precise placement location (e.g., placement location 106 as discussed with respect to FIG. 1) for drilling or conduit installation.

First surface 404 may represent a structural element such as a wall, panel, or ceiling through which pipe 110 passes. Hole 402, through which pipe 110 exits, may be pre-drilled or pre-fabricated, serving as an anchor or guide for aligning pipe 110 during installation. While hole 402 is labeled, two additional adjacent holes are illustrated on first surface 404. For instance, one hole may include a fastening component, such as a nut, which may be used to secure a fixture or additional equipment. In some aspects, a hole may also serve as mounting points, cable pathways, or openings for related conduits or pipes.

Pipe conduit locator system 102, attached to the lower end of pipe 110, uses its focused-light system (e.g., focused-light system 108 which may include a laser or other marking technology) to project a visible marking or alignment guide onto second surface 406. This marking indicates the precise point where drilling should occur or where the conduit should align for installation. In some embodiments, the projection provides real-time feedback by continuously updating the placement location as adjustments are made to pipe 110. Second surface 406 may represent a structural element or installation target, including, but not limited to, a floor, cabinet, electrical panel, wall, ceiling, rafter, stud, or any other obstacle requiring precise alignment for drilling or conduit installation.

As depicted in the embodiment of FIG. 4, pipe conduit locator system 102 operates in conjunction with existing structural elements to ensure alignment and accuracy during installation. The positioning of hole 402 and the role of pipe conduit locator system 102 in marking second surface 406 highlight the system's 102 utility in environments with multiple obstacles or pre-existing fixtures. For example, this configuration enables precise alignment of pipe 110 between first surface 404 and second surface 406, avoiding misalignments that could result in rework or material waste.

In some embodiments, pipe conduit locator system 102 accommodates various installation scenarios by utilizing additional guiding mechanisms or attachment methods. In some examples, system 102 employs non-laser alignment methods, such as ultrasonic sensors or physical pointers, to mark placement locations discussed above with respect to FIGS. 1-3. Additionally the system may integrate advanced AI and machine learning (ML) capabilities to optimize installation accuracy and efficiency discussed above with respect to FIGS. 1-3. For example, an onboard or connected computing system may collect sensor data from sensors with respect to FIGS. 1-3. This data may be used to detect structural irregularities, predict optimal placement angles, and recommend adjustments to ensure accurate alignment. As discussed above, AI models may be trained on prior installation data to recognize patterns in misalignment issues and suggest corrections before drilling occurs. The system may further incorporate adaptive calibration algorithms that automatically refine alignment parameters based on real-world conditions. AI-based feedback could be provided via a digital interface or augmented reality (AR) display, allowing installers to visualize the suggested placement within a construction management platform.

In some aspects, while the illustrated embodiment depicts a focused-light system for marking second surface 406, other configurations could include wireless communication (such as those discussed below with respect to FIG. 7) with a digital blueprint or CAD model (as discussed above with respect to FIGS. 1-3), enabling users to overlay alignment data directly onto digital construction plans. The pipe conduit locator system 102 may synchronize with Building Information Modeling (BIM) platforms, such as Autodesk BIM 360 or Procore, allowing real-time placement verification against pre-defined installation parameters. In some embodiments, the pipe conduit locator system 102 may transmit alignment data wirelessly to an on-site tablet, mobile device, or augmented reality (AR) headset, overlaying the projected placement location onto a real-time view of the construction site. This may enable installers to confirm that the intended drilling location aligns with structural plans before physically marking or modifying surfaces. Additionally, AI-powered analysis may flag potential conflicts between conduit placement and other elements (e.g., HVAC ducts, support beams, electrical panels), suggesting alternate configurations to avoid installation errors. Furthermore, by integrating with cloud-based construction management systems, project managers and remote supervisors may monitor conduit placement progress, review alignment accuracy, and ensure compliance with engineering tolerances or regulatory requirements. This integration may streamline inspection workflows by digitally logging completed installations, reducing the need for manual verification and minimizing rework. These methods may be combined with with those discussed herein.

FIG. 5 depicts a flow diagram of a method 500. Method 500 is one embodiment of a method of finding a placement location for drilling or conduit installation (e.g., as performed by pipe conduit locator system 102). In some embodiments, method 500 includes more or fewer processes than shown.

Method 500 begins with process 505 for attaching, via a housing, a pipe conduit locator system to a pipe, the housing configured to enclose a set of components of the pipe conduit locator system. In some examples, as discussed above with respect to FIG. 1, housing of pipe conduit locator system 102 may be positioned onto pipe 110 using various attachment methods, such as a threaded connection, magnetic fasteners, or a separate clamping mechanism. The housing serves as the structural framework that supports the internal components, such as focused-light system 108, and protects them during use. In some embodiments, the housing may further include quick-release mechanisms or adjustable fittings that facilitate rapid mounting or repositioning to accommodate pipes of different sizes and materials, enhancing usability in various installation environments.

Method 500 continues with process 510 with projecting, via a light-guided system disposed within the housing, a beam of light towards a placement location on a surface for drilling or conduit installation. For example, focused-light system 108 may project a light beam to precisely identify placement location 106 on a surface, such as a wall, floor, or electrical panel, to guide drilling or conduit installation. In some embodiments, the system may integrate distance measurement sensors or inclination detectors to verify the precise positioning of the projection relative to the intended placement location. These sensors may enable real-time feedback on whether the system is properly aligned, accounting for any tilt or deviation in angle or distance from target point. Additionally, in cases where the system is connected to a digital environment, such as a CAD model or construction blueprint, the projection may be synchronized with digital measurements to confirm accuracy and automatically adjust for misalignment before drilling begins. Feedback may be given in the form of visual, audible, or haptic alerts as discussed above with respect to FIGS. 1-3.

Method 500 continues with process 515 with securing, via a clamping mechanism coupled to the housing, the pipe conduit locator system to the pipe to maintain stable alignment with the placement location. For example, after the housing is attached to the pipe, clamping mechanism 200 may engage to provide a firm grip on the pipe's outer surface, ensuring that pipe conduit locator system 102 remains in a stable position. In some embodiments, clamping mechanism 200 includes prongs or gripping elements that adjust to different pipe diameters and materials. This securing action prevents unintended movement of the system during alignment and operation, allowing for accurate placement of the laser-guided system.

In some embodiments, the clamping mechanism comprises a plurality of prongs (e.g., prongs 202, 302 as illustrated in FIGS. 2-3). In some examples, clamping mechanism 200 may include three or more prongs 202 with various combinations of coatings or grips to enhance friction and prevent slippage when secured to the outer surface of pipe 110. These prongs may adjust to accommodate pipes of varying diameters, providing a stable and secure attachment for the pipe conduit locator system 102 during alignment and operation. In some embodiments, the housing comprises a quick-release mechanism configured to enable rapid attachment and detachment of the system from the pipe. As discussed above, a quick-release mechanism, such as a lever, push-button, or spring-loaded latch, may allow for secure attachment or removal of the pipe conduit locator system 102 from pipe 110. This feature may enhance usability in construction environments where frequent repositioning or adjustments are required, reducing setup time and improving efficiency. In some embodiments, the system includes a visual display on the housing configured to provide real-time feedback about the placement location including alignment accuracy or distance to the placement location. In some examples, focused-light system 108 may include a visual display integrated into housing 102, which shows real-time information such as whether the system is properly aligned with the desired placement location 106 and/or the measured distance from the pipe conduit locator system 102 to the placement location 106. This feedback may assist users in ensuring precise alignment and accurate positioning for drilling or conduit installation, reducing errors and enhancing operational efficiency. In some examples, the system may provide real-time visual indicators, such as an on-device display or LED markers, to guide users in adjusting the position before finalizing placement. Additionally, audible or haptic alerts (e.g., using a microphone or vibrational sensors, not shown) may notify the user if the alignment is off-center, prompting corrections to ensure the pipe is positioned correctly relative to the intended drilling location. In some examples, the housing further comprises an inertial measurement unit (IMU) configured to detect orientation and position of the system relative to the pipe and the surface. In some examples, housing 102 may include an integrated IMU comprising accelerometers and gyroscopes that provide real-time data on the orientation and positioning of the pipe conduit locator system 102 relative to pipe 110 and surface 106. This capability can ensure that the system remains correctly aligned throughout the process and can provide feedback to users when adjustments are necessary, improving accuracy in challenging installation scenarios.

In some embodiments, the system is integrated with wireless communication capabilities configured to transmit alignment or placement data to a computing system. In some examples, focused-light system 108 may include a wireless communication module, such as a Bluetooth® or Wi-Fi® transceiver (or other wireless systems discussed below with respect to FIG. 7), enabling pipe conduit locator system 102 to transmit real-time data about alignment accuracy or placement location 106 to a connected mobile device or computer system. This functionality can allow supervisors or project managers to remotely monitor alignment progress, store records for compliance purposes, or provide additional instructions based on the transmitted data. In some embodiments, the pipe conduit locator system comprises a computer system configured to execute artificial intelligence or machine learning algorithms to optimize the placement location. For example, pipe conduit locator system 102 may include an onboard computer system (e.g., computer system 700 as described with respect to FIG. 7) that leverages AI or ML algorithms (discussed above with respect to FIG. 1) that may analyze historical data, environmental factors, or user input, etc. to optimize the placement location 106 for drilling or conduit installation. In some examples, the system could adjust light beam 104 based on detected obstacles, surface irregularities, or alignment angles, ensuring enhanced precision and efficiency in various installation scenarios. In some embodiments, the pipe conduit locator system comprises a feedback mechanism integrated with the light-guided system, the feedback mechanism configured to provide real-time alignment or calibration information, the feedback mechanism includes a level detection system or an indicator for verifying alignment relative to the pipe and the placement location. In some examples, pipe conduit locator system 102 may include a feedback mechanism integrated into focused-light system 108, such as a level detection sensor or a visual indicator. This mechanism may provide real-time information about the alignment of the system relative to pipe 110 and placement location 106, ensuring precise positioning during operation. In some examples, the feedback mechanism could indicate whether the system is level or aligned properly with the intended drilling location, using visual cues (e.g., LED indicators) or digital readouts on a display. This feature may enhance accuracy and reduce errors during installation. This feedback mechanism will be described in further detail with respect to FIG. 6 below.

Figure 6:
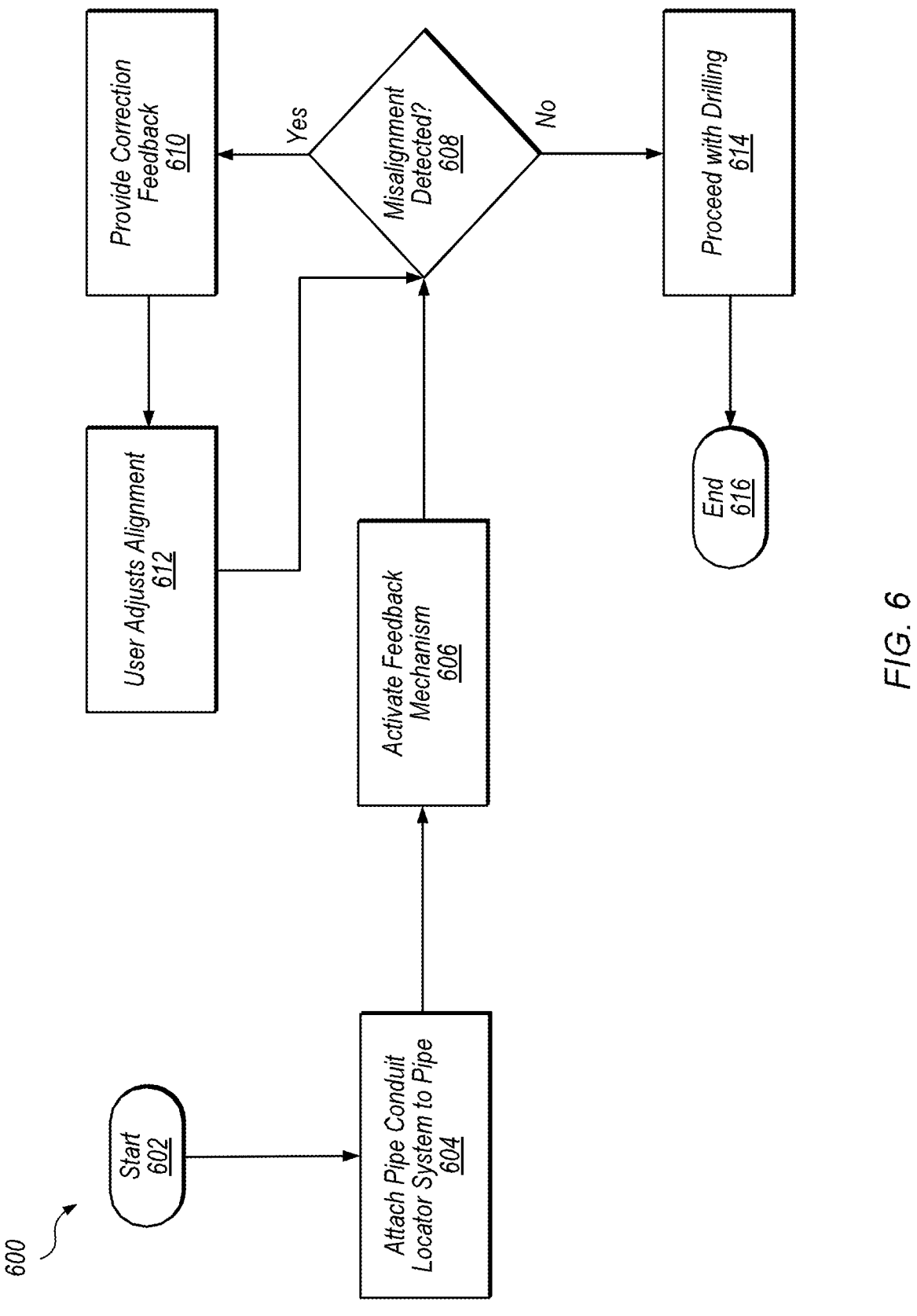
FIG. 6 is a flow diagram illustrating an example of a pipe conduit locator system alignment process.

Turning now to FIG. 6, a flow diagram illustrating an example of a pipe conduit locator system alignment process is depicted. In the illustrated embodiment of FIG. 6, process 600 begins with start 602 and proceeds to block 604 to attach a pipe conduit locator system (e.g., pipe conduit locator system 102) to a pipe (e.g., pipe 110). After attachment, process 600 continues to block 606, where the feedback mechanism of the pipe conduit locator system is activated. The feedback mechanism (as discussed above with respect to FIGS. 1-5) may include level detection sensors, inertial measurement units (IMUs), or other alignment verification technologies that assess the position of the system relative to the pipe and placement location.

Process 600 then proceeds to decision block 608, where the system determines whether a misalignment is detected, as discussed above with respect to FIGS. 1-5. In some examples, misalignment may be identified based on tilt angles, deviation from a predefined axis, and/or discrepancies between the projected placement location and an expected drilling point. Such identification may be determined by the synchronization with digital measurements and/or a CAD model or construction blueprint. such as a Building Information Modeling (BIM) platform, a digital twin environment, or a cloud-based construction management system (e.g., Procore, Autodesk BIM 360, Trimble Connect), VR/AR, etc. This synchronization may enable seamless integration of real-time conduit placement data into digital blueprints, allowing construction teams to coordinate installation workflows and reduce trade conflicts. In some examples, during a large-scale commercial build, geotagging may be used to create a digital map of all installed conduits, ensuring that electrical, plumbing, and HVAC installations do not interfere. If a conduit needs to be relocated due to unforeseen obstacles, the system may suggest an alternative path while automatically updating the digital plans. Additionally, integration of pipe conduit locator system 102 with Augmented Reality (AR) and Virtual Reality (VR) visualization tools could allow installers to see projected conduit pathways including orientation of system 102 in real-time, using tablet-based AR overlays or wearable devices. This data synchronization also enhances long-term facility management. Years after installation, facility managers can use the stored site plan data to precisely locate conduits hidden behind walls, ceilings, or underground, reducing unnecessary excavation or wall penetration during maintenance. In some embodiments, the system may provide automated compliance reports, helping contractors and inspectors verify that conduit installations align with safety codes and project specifications. By enabling continuous digital updates, pipe conduit locator system 102 may help construction teams reduce costly rework, ensure efficient coordination between trades, and streamline installation workflows for smart buildings and large-scale infrastructure projects, and other advantages discussed herein.

If no misalignment is detected, process 600 proceeds to block 614, where the system proceeds with drilling, ensuring accurate placement of the conduit or pipe entry point.

If misalignment is detected at decision block 608, process 600 continues to block 610, where the system provides feedback. Feedback may result in the form of visual, audible, and/or haptic alerts as discussed above with respect to FIGS. 1-5. In some embodiments, the system may generate visual, auditory, or haptic feedback to notify the user of alignment issues. In some examples, a digital display may indicate corrective adjustments, an LED indicator may flash, a message may display, or an audible alert may guide the user in realigning the system. In some examples, feedback could be either regarding the placement of pipe conduit locator system 102 or the securing of clamping mechanism (e.g., clamping mechanism 200 or 300).

After receiving feedback, process 600 advances to block 612, where the user adjusts the alignment accordingly based on the provided feedback. Adjustments may include repositioning the pipe conduit locator system, realigning it with the intended placement location, or making fine-tuned modifications to account for environmental variables such as surface irregularities.

Once alignment adjustments are made, process 600 loops back to decision block 608 to re-evaluate whether misalignment is still present. This iterative process ensures that the system verifies alignment accuracy before drilling. If no further misalignment is detected at decision block 608, process 600 proceeds to block 614 to initiate drilling at the identified placement location. Once drilling is completed, process 600 concludes at end 616.

In some embodiments, process 600 may incorporate additional functionalities, such as logging alignment data, transmitting adjustments to a connected computing system (e.g., a CAD model or digital blueprint), or integrating real-time feedback from an AI-driven calibration system. These enhancements may further optimize alignment precision and workflow efficiency in various installation environments.

Exemplary Computer System

Turning now to FIG. 7, a block diagram of an exemplary computer system 700, which may implement system 100 (or one or more components included in systems 100), is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 6 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement elements of systems 100 or 400 (e.g., elements 130, 140, 170, 420, 430, etc.) may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 and may be connected via any type of wired or wireless connections, such as dedicated short-range communications (DSRC), satellite, fire wire, network, USB, Wi-Fi, radio-frequency identification (RFID), BLUETOOTH, GPS, Near Field Communication (NFC), Infrared (e.g., GSM infrared), and/or the like and/or using any suitable wireless communication standards and protocols, such as IEEE 802.11 and WiMAX. The network including any intervening nodes, may be any kind of network including a local area network (LAN) such as an Ethernet, a wide area network (WAN) such as an internet, a virtual or non-virtual private network, and/or the like and/or combinations thereof.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A pipe conduit locator system, comprising:
   a housing comprising a focused-light system disposed within the housing and a clamping mechanism having a plurality of prongs configured to engage with a hollow surface, the focused-light system configured to project light towards a target location and the clamping mechanism adapted to move between an open position and a closed position,
   wherein the movement of the clamping mechanism between the closed position and the open position includes rotation of the prongs about a rotation axis.

2. The pipe conduit locator system of claim 1, further comprising a motor coupled to the clamping mechanism, wherein each prong of the clamping mechanism is configured to move between the open position to the closed position through the use of a motor assembly.

3. The pipe conduit locator system of claim 1, wherein the light projected by the focused-light system is a laser, high-intensity LEDs, structured light projectors, or collimated beam sources.

4. The pipe conduit locator system of claim 1, further comprising a display attached to the housing, the display configured to display information associated with one or more of the orientation or position of the focused-light system.

5. The pipe conduit locator system of claim 1, the housing further comprises an inertial measurement unit (IMU) configured to detect orientation and position of the pipe conduit locator system relative to the hollow surface and the target location.

6. The pipe conduit locator system of claim 1, further comprising a feedback mechanism coupled to the clamping mechanism, the feedback mechanism configured to provide feedback about engagement of the prongs with the hollow surface.

7. The pipe conduit locator system of claim 6, where feedback of the feedback mechanism is provided in the form of visual, audio, or haptic means.

8. The pipe conduit locator system of claim 1, each prong having a rubberized or textured surface.

9. The pipe conduit locator system of claim 1, wherein the clamping mechanism comprises a quick-release mechanism configured to enable rapid attachment and detachment of the system from the hollow tube.

10. The pipe conduit locator system of claim 1, wherein the housing includes a visual display configured to display feedback about the placement location including alignment accuracy or distance to the placement location.

11. The pipe conduit locator system of claim 1, wherein the housing further comprises an inertial measurement unit (IMU) configured to detect orientation and position of the system relative to the pipe and the surface.

12. The pipe conduit locator system of claim 1, wherein the focused-light system is integrated with wireless communication capabilities configured to transmit alignment or placement data to a computing system.

13. The pipe conduit locator system of claim 12, the computing system is configured to apply a machine learning model to the data to generate feedback in response to the data, the feedback being in the form of visual, auditory, or haptic means.

14. The pipe conduit locator system of claim 13, the computing system is configured to obtain, at the machine learning model, the data associated with the pipe conduit locator system; and determine, by the machine learning model, one or more recommendations based on the data associated with the pipe conduit locator system, historical data, and a construction plan associated with the elongated body.

15. The pipe conduit locator system of claim 1, further comprising a feedback mechanism coupled to the focused-light system, the feedback mechanism configured to provide real-time alignment or calibration information.

16. The pipe conduit locator system of claim 1, further comprising a transmitter configured to transmit information associated with the orientation of the focused-light system and the target location.

* * * * *